(12) United States Patent
Ahn

(10) Patent No.: US 7,836,073 B2
(45) Date of Patent: Nov. 16, 2010

(54) METHOD AND SYSTEM FOR TRANSMITTING PRE-FORMULATED QUERY TO DATABASE

(75) Inventor: Junghwan Ahn, Seoul (KR)

(73) Assignee: NHN Corporation, Seongnam-si (KR)

( * ) Notice: Subject to any disclaimer, the term of this patent is extended or adjusted under 35 U.S.C. 154(b) by 252 days.

(21) Appl. No.: 11/528,103

(22) Filed: Sep. 27, 2006

(65) Prior Publication Data

US 2007/0073664 A1 Mar. 29, 2007

(30) Foreign Application Priority Data

Sep. 29, 2005 (KR) .............. 10-2005-0091320

(51) Int. Cl.
*G06F 17/30* (2006.01)
*G06F 7/00* (2006.01)

(52) U.S. Cl. .................. 707/770
(58) Field of Classification Search ........... 707/770
See application file for complete search history.

(56) References Cited

U.S. PATENT DOCUMENTS

| | | | | |
|---|---|---|---|---|
| 5,987,454 | A * | 11/1999 | Hobbs ............... | 707/4 |
| 6,557,111 | B1 * | 4/2003 | Theimer et al. ..... | 714/4 |
| 6,599,186 | B1 * | 7/2003 | Walker et al. ........ | 463/17 |
| 6,697,819 | B2 * | 2/2004 | Boudreau ........... | 707/103 R |
| 6,789,073 | B1 * | 9/2004 | Lunenfeld ........... | 707/3 |
| 2001/0013038 | A1 * | 8/2001 | Purcell ............... | 707/10 |
| 2002/0129010 | A1 * | 9/2002 | Fung et al. ......... | 707/3 |
| 2003/0028632 | A1 * | 2/2003 | Davis ................. | 709/224 |
| 2003/0033295 | A1 * | 2/2003 | Adler et al. ......... | 707/3 |
| 2006/0135264 | A1 * | 6/2006 | Shaw et al. ......... | 463/42 |

FOREIGN PATENT DOCUMENTS

| | | |
|---|---|---|
| JP | 2001-243240 A | 9/2001 |
| JP | 2002-521753 A | 7/2002 |
| KR | 10-2000-0047631 A | 7/2000 |
| KR | 10-2002-0033223 A | 5/2002 |
| KR | 10-2005-0077048 A | 8/2005 |

OTHER PUBLICATIONS

An Office Action dated Oct. 23, 2006 from Korean Patent Application No. 10-2005-0091320.
Office Action dated Jun. 2, 2009 of corresponding Japanese Patent Application No. 2006-260941—3 pages.

* cited by examiner

*Primary Examiner*—John R. Cottingham
*Assistant Examiner*—Nicholas E Allen
(74) *Attorney, Agent, or Firm*—H.C. Park & Associates, PLC

(57) ABSTRACT

A method of transmitting a query to a database, the method including: maintaining a database gateway storing at least one query corresponding to a predetermined group identifier and a query identifier; maintaining a database list of a plurality of databases connected to the database gateway; receiving a group identifier and a query identifier associated with a certain query, from a client; identifying a query corresponding to the received group identifier and query identifier at the database gateway; transmitting the identified query to a corresponding database by referring to the database list; and performing data retrieval by using the transmitted query at the database and generating and transmitting retrieval result information to the database gateway as a reply.

18 Claims, 4 Drawing Sheets

FIG. 3 i)

| DEFINED QUERY | PAIR OF IDENTIFIERS | | DB PROPERTY IDENTIFIER | DB LOCATION IDENTIFIER |
|---|---|---|---|---|
| | GROUP IDENTIFIER | QUERY IDENTIFIER | | |
| ID OF MEMBER IN GAME ZONE MARKET | A | 1 | mssql | DB #1 (175.33.0.1) |
| ID OF MEMBER WHOSE LEVEL IS HIGHER THAN 100 | A | 2 | oracle | DB #2 (175.33.0.2) |
| ID OF MEMBER ACCESSING 10TH GAME SERVER | B | 1 | mysql | DB #3 (175.33.0.3) |
| ID OF MEMBER REGISTERING AFTER 2005 | A | 3 | oracle | DB #2 (175.33.0.2) |
| ID OF MEMBER ACCESSING TODAY | B | 2 | mssql | DB #1 (175.33.0.1) | ii)

<RETRIEVAL RESULT INFORMATION>

| QUERY: "ID OF MEMBER WHOSE LEVEL IS HIGHER THAN 100" | |
|---|---|
| MEMBER ID | CURRENT LEVEL |
| warrior | 110 |
| bowyer | 112 |
| witch | 106 |
| ⋮ | ⋮ |

METHOD AND SYSTEM FOR TRANSMITTING PRE-FORMULATED QUERY TO DATABASE

CROSS-REFERENCE TO RELATED APPLICATIONS

This application claims the priority to Korean Patent Application No. 10-2005-0091320, filed on Sep. 29, 2005, in the Korean Intellectual Property Office, the disclosure of which is incorporated herein by reference in its entirety.

BACKGROUND

1. Field

The present invention relates to a computer network based service, and more particularly responding queries from users of the service.

2. Description of Related Art

Generally, a server providing a service such as a game is directly connected to a database. A generated query is transmitted to the directly connected server to perform data retrieval, thereby generating a retrieval result. In a conventional query transmission method, since there is no relationship between databases connected to different servers, a query generated by a certain server may be transmitted limited to a database directly connected to the server and a retrieval result may be generated within a limited data scope.

Accordingly, a quality of a retrieval result with respect to a query in each server may be determined according to an amount of data in the database. To include a greater amount of data, it is required to continuously secure various data.

However, since an apparatus for consolidating an excessively large amount of data in every database is required, additional costs or efforts of workers are prohibitively increased.

When there is a query transmission method enabling a plurality of databases to operate as one database by systematically connecting the plurality of databases storing mutually different data, since a greater amount of data can be included in a retrieval result generated in response to a query, a client inputting a query may be more satisfied than with a more limited database.

Also, in a conventional method of inputting a query by a client whenever required, an error may occur in a retrieval result, due to insufficient knowledge when inputting a query or inputting a wrong query.

Accordingly, there is seriously required a query transmission model capable of preventing an error occurring when inputting a query, by previously making and maintaining standardized queries, selectively retrieving a certain query according to a request of a client, and transmitting the query to a certain database. Also, there is also seriously required a query transmission model capable of generating a retrieval result including a greater amount of data by enabling data retrieval with respect to a query to be performed in a plurality of databases including different data by systematically connecting the plurality of databases.

The foregoing discussion is only to provide background information and does not constitute an admission of prior art.

SUMMARY

One aspect of the invention provides a method of processing a query. The method comprises providing a database gateway in communication with a plurality of databases comprising a first database; receiving, in the database gateway, a pre-formulated query or information indicative of the pre-formulated query from a terminal associated with a user; selecting, in the database gateway, the first database from the plurality of databases, wherein the first database is known to the database gateway as capable of answering the query; transmitting the information or the query to the first database; and coordinating, in the database gateway, to make an answer available to the user.

The foregoing method, coordinating may comprise: receiving, in the database gateway, the answer from the first database; and forwarding the answer to the terminal or another terminal associated with the user. It may be predetermined that the pre-formulated query is to be answered by the first database. A list of the plurality of data bases connected to the gateway may be stored in the database gateway. The first database may be updated with data to be used in answering the query along with one or more other databases belonging to the plurality of the databases. The first database may be updated by multicasting to at least part of the plurality of databases information so as to make the at least part of the plurality of databases to be consistent. The database gateway may receive the information indicative of the query, and wherein the method may further comprise identifying, in the database gateway, the query using the information.

Still in the foregoing method, the information indicative of the query may comprise a query identifier. The information indicative of the query may comprise a query identifier and a group identifier. The database gateway may comprise a computer or a computerized device connected to an information network and configured to process the received query. The first database may comprise a computer or a computerized device storing data and configured to process the query or the information transmitted from the database gateway. The database gateway selects the first database as the first database has a particular property known to the database gateway that enables the first database to make an appropriate response to the query.

Another aspect of the invention provides a system for processing a query. The system comprises: a database gateway communicably connected to a plurality of databases comprising a first database, the first database comprising data and being configured to process and answer a query using the data. The database gateway comprises: a query receiver configured to receive a pre-formulated query or a query identifier identifying the pre-formulated query transmitted from a terminal associated with a user; a processor configured to select the first database from the plurality of databases using information that the first database is capable of answering the query, wherein the information is available to the processor; and an answer coordinator configured to transmit the query or the query identifier to the first database and configured to coordinate the first database so as to make an answer from the first database available to the user.

In the foregoing system, it may be predetermined that the pre-formulated query is to be answered by the first database. The answer coordinator may be configured to receive the answer from the first database and further configured to forward the answer to the terminal or another terminal associated with the user. A list of the plurality of data bases connected to the gateway may be stored in the database gateway. The first database may be configured to be updated with data to be used in answering the query along with one or more other databases belonging to the plurality of the databases. The query receiver may be configured to receive the information indicative of the query, and wherein the database gateway may be configured to identify the query using the information. The information indicative of the query may comprise a query identifier and a group identifier. The first database may comprise a computer or a computerized device storing data and configured to process the query or the information transmitted from the database gateway.

An aspect of the present invention provides a query transmission method and system in which queries are previously defined or pre-formulated and maintained and a query corresponding to a group identifier and query identifier received from a client, thereby preventing an error occurring when the client directly inputs a query.

An aspect of the present invention also provides a query transmission method and system in which a plurality of databases is systematically associated with each other as one database to be used for data retrieval, thereby generating more various and plentiful retrieval result information than data retrieval performed limited to one database.

An aspect of the present invention also provides a query transmission method and system in which a change in a query transmission environment is recognized by simply updating a database list, instead of changing all of source programs associated with the query transmission environment.

According to an aspect of the present invention, there is provided a method of transmitting a query to a database, the method including: maintaining a database gateway storing at least one query corresponding to a predetermined group identifier and a query identifier; maintaining a database list of a plurality of databases connected to the database gateway; receiving a group identifier and a query identifier associated with a certain query, from a client; identifying a query corresponding to the received group identifier and query identifier at the database gateway; transmitting the identified query to a corresponding database by referring to the database list; and performing data retrieval by using the transmitted query at the database and generating and transmitting retrieval result information to the database gateway as a reply.

According to another aspect of the present invention, there is provided a system for transmitting a query to a database, the system including: a database gateway storing at least one query corresponding to a predetermined group identifier and a query identifier; and a database connected to the database gateway, performing data retrieval by using a transmitted query at the connected database gateway, and generating and transmitting retrieval result information to the database gateway as a reply.

BRIEF DESCRIPTION OF THE DRAWINGS

The above and other aspects and advantages will become apparent and more readily appreciated from the following detailed description, taken in conjunction with the accompanying drawings of which:

FIG. 3 is a diagram illustrating an example of identifying a defined or pre-formulated query and data retrieval using the identified defined query.

DETAILED DESCRIPTION OF EMBODIMENTS

Figure 1:
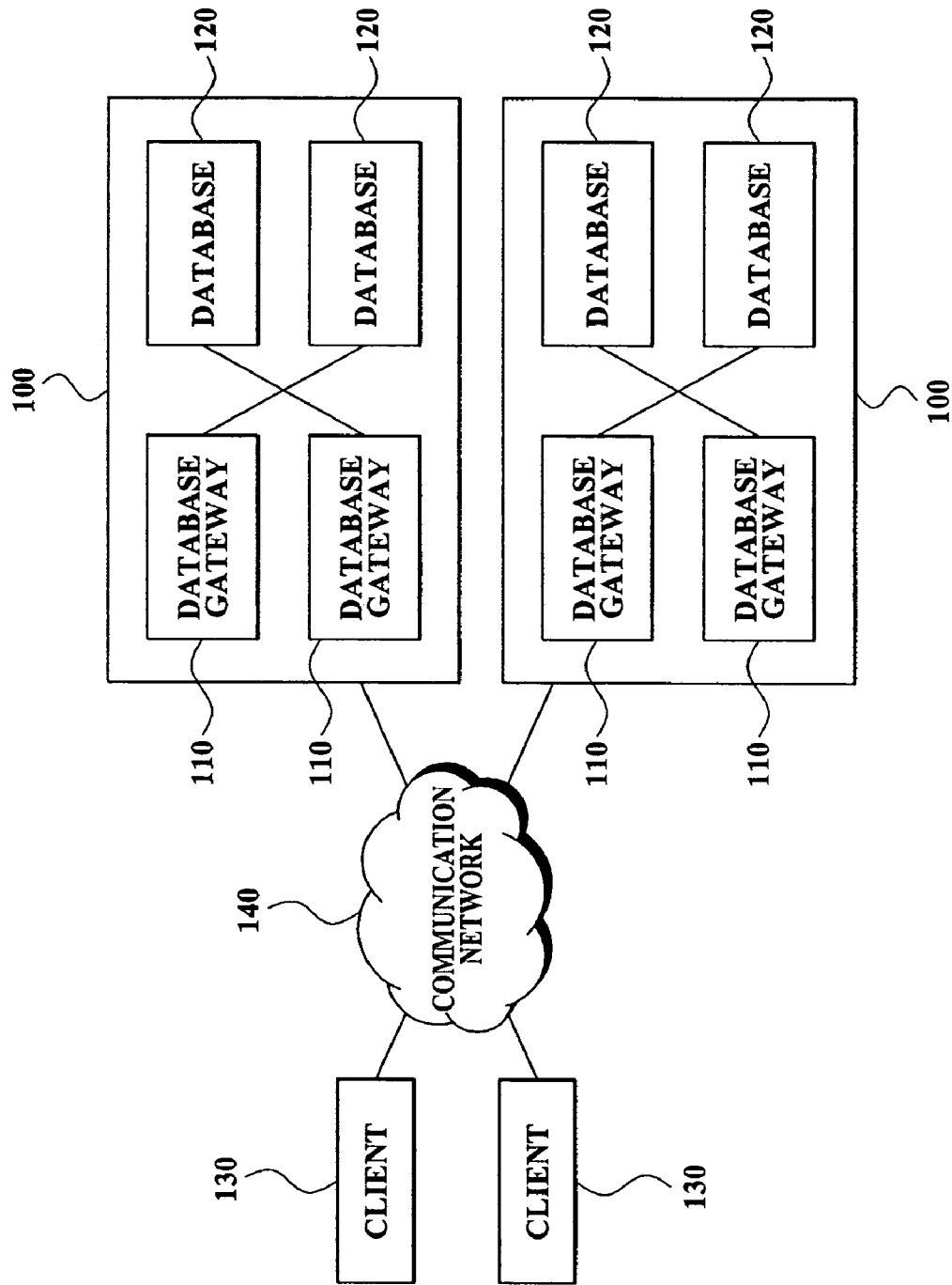
FIG. 1 is a diagram illustrating a network connection between a database gateway and a database according to an embodiment of the present invention.

Reference will now be made in detail to certain embodiments of the present invention, examples of which are illustrated in the accompanying drawings, wherein like reference numerals refer to the like elements throughout. The embodiments are described below by referring to the figures.

In embodiments of the present invention, a query is created by a client, that is a retriever, combining predetermined conditions to acquire a desired result and may indicate an inquiry used for retrieval in a database. Generally, a retrieval result may be generated by using the query in response to a field area for defining an object of the retrieval, selected by the client. For example, in a retrieval from a game database that includes personal information of a gamer, when "ID of a member whose level is higher than 100" is selected by a client as the field area of the query, the game database may generate an ID list of gamers corresponding to the field area "ID of a member whose level is higher than 100" and may provide the generated ID list, as a retrieval result, to the client that selected the query.

In embodiments of the present invention, the query is previously determined and maintained (hereinafter, the previously determined query is referred to as a defined or pre-formulated query.). A time for generating a query may be reduced by performing retrieval in a database by using the defined query identified according to selection of the client. Also, a query is precisely generated by reducing an error in generating the query. The defined query may be maintained in association with a database gateway connected to at least one database and managing data retrieval over the connected databases.

FIG. 1 is a diagram illustrating a network connection between a database gateway and a database according to an embodiment of the present invention.

A query transmission system 100 stores a defined query previously standardized in a database gateway 110 and transmits a defined query identified in response to a pair of identifiers including a group identifier and a query identifier, received from a client 130, to at least one database 120 connected to the database gateway 110.

The database gateway 110 maintains a plurality of the defined queries previously generated. The group identifier and the query identifier are corresponding to each defined query to enable the client 130 to selectively call a corresponding defined query by using the group identifier and the query identifier.

In this case, the group identifier may be assigned by an administrator of the system by considering an area in which the query frequently occurs or service characteristic of the query. For example, one common group identifier A may be assigned to a plurality of queries associated with updating new data. Also, the query identifier is assigned to identify each of the defined queries having the same group identifier. For example, a query identifier is sequentially assigned from 1, with respect to the defined queries commonly having the group identifier A, thereby distinguishing each of the defined queries having the same group identifier.

Also, the database gateway 110 is connected to a plurality of the databases 120 in which the defined query is retrieved and systematically integrating the plurality of the databases 120 as one database to retrieve data, thereby generating more various and plentiful retrieval result information than data retrieval in one database.

Between the plurality of the databases 120 connected to one database gateway 110, since a message associated with data included in the databases 120 is continuously exchanged, a multicast process for maintaining an identical data state in each of the databases 120 may be performed. In this case, although a message is being transmitted to any one of the databases 120 connected to the database gateway, the defined query identified at the database gateway 110 may generate the same retrieval result information.

Also, the database gateway 110 may designate the database for processing the identified query. In this case, the query may be transmitted to only the designated database 120 to perform data retrieval. In addition, a matter associated with data changed according to the data retrieval or data inflow may be used only in the designated database 120 (an anycast process). The matter associated with the data stored in a certain database 120, applied by the anycast process, may be applied to other databases 120 by the above multicast.

The database 120 generates predetermined retrieval result information in response to the defined query received from the database gateway 110 and transmits the generated retrieval result information to the database gateway 110. Particularly, in some embodiments, the database 120 may select the database gateway 110 to which the database 120 will be connected, by considering a geographical occurrence location or service characteristic of the query. For example, to the database gateway 110 maintaining many of the defined queries with respect to personal information of a gamer, the database 120 including data associated with the personal information of the gamer and generating a retrieval result in response to a corresponding query may be selectively connected.

To generate a desired query, the client 130 transmits a group identifier and a query identifier associated with the corresponding query to the database gateway 110, thereby extracting a defined query similar to the desired query from the database gateway 110. For example, the client 130 wanting to generate a query associated with a request for personal information of a gamer may transmit a pair of identifiers such as a group identifier A and a query identifier 1, capable of identifying a defined query associated with the request for the personal information, to the database gateway 110. Accordingly, the database gateway 110 may identify the defined query associated with gamer information specified by the group identifier A, and the query identifier 1 from a plurality of included defined queries.

Namely, the query transmission system 100 identifies a defined query corresponding to a pair of identifiers from the client 130, from the database gateway 110 and transmits the identified defined query to any one or a certain one of the databases 120 connected to the database gateway 110, thereby enabling data retrieval using the defined query. Hereinafter, a configuration of a query transmission system 200 will be described in detail referring to FIG. 2.

Figure 2:
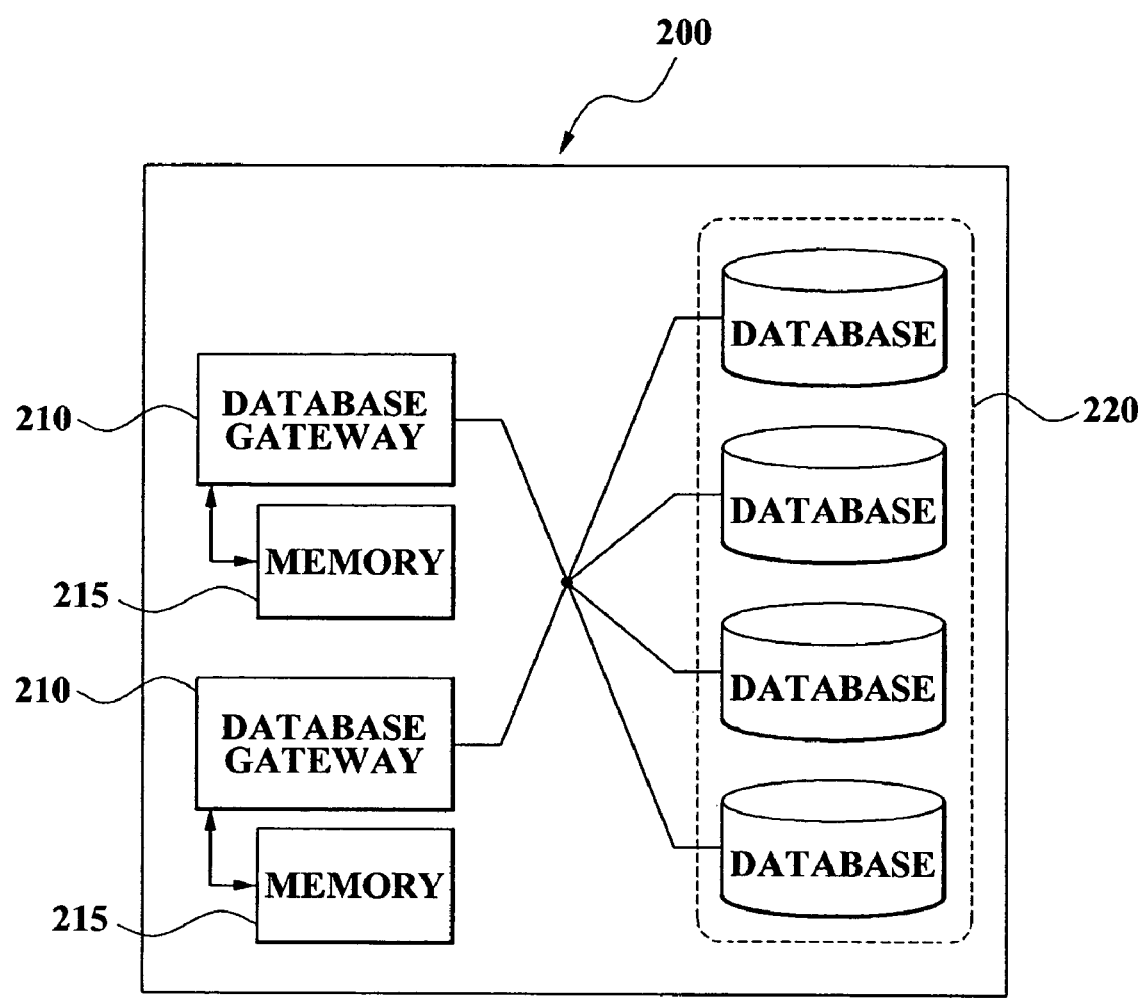
FIG. 2 is a diagram illustrating a query transmission system according to an embodiment of the present invention.

FIG. 2 is a diagram illustrating the query transmission system 200 according to an embodiment of the present invention. The query transmission system 200 includes a plurality of database gateways 210 and a plurality of databases 220.

The database gateway 210 stores at least one query corresponding to a predetermined group identifier and a query identifier. Namely, the database gateway 210 functions as a memory storing a query previously made by the administrator and matches a group identifier and a query identifier with each query to identify a query desired by the client 130 as a certain defined query. In this case, the defined query may be stored in a memory 215 included in each database gateway 210, in response to the group identifier and the query identifier.

As described above, the group identifier may be assigned to each of the defined queries by considering an area in which a query frequently occurs or service characteristic of the query. The query identifier may be individually assigned to the defined query to distinguish at least one defined query to which the same group identifier is assigned.

The database gateway 210 matches a database (DB) property identifier defining a property of the database 220 to which a query will be transmitted, thereby identifying the query corresponding to the group identifier and the query identifier as well as the property of the database 220. Namely, the database gateway 210 may recognize the property of the connected database 220, different according to a creator and may selectively identify a query normally operating with respect to the recognized property of the database 220. In this case, the DB property identifier defines the property of the database 220 in which a query properly operates. For example, when the database 220 is embodied by Oracle, the administrator may input the query optimally operating in an Oracle environment. The database gateway 210 matches the query with a DB property identifier associated with Oracle to maintain the query. When the database 220 embodied by Oracle is connected to the database gateway 210 and a group identifier and a query identifier are received from the client 130, the database gateway 210 may selectively identify a query corresponding to the DB property identifier associated with Oracle and may transmit the identified query to the database 220 that is embodied by Oracle.

Thus, according to the query transmission system 200, a query is previously made by considering the property of the database 220, and considering a query optimally operating in a corresponding database 220 according to the property of the database 220 connected to the database gateway 210. Accordingly, whenever the client 130 inputs a query, a difficulty of making a suitable query different dependent upon the property of a database to which the query will be transmitted, for example, a vendor environment such as Oracle, MSSQL, and MSYQL, may be reduced.

Also, the database gateway 210 may record the property of the database 220 connected to the database gateway 210, in a database list to enable the identified query to precisely verify the database 220 to which the query will be transmitted. Namely, the query transmission system 200 may retrieve an address of the database 220 to which the query will be transmitted, from the database list by considering the property associated with the identified query and the property of the database 220, and may transmit the query to the database 220 corresponding to the retrieved address.

Accordingly, although there is a change in an access environment, such as a change into another device, division into two or more devices, or addition of a new device of the database 220 connected to the database gateway 210, the address of the database in which the identified query can normally operate may be verified by only updating the database list. Also, since the query is previously made by considering the property of the database 220 in which the query is performed, although the connected database 220 is changed, query identification may be elastically managed.

In addition, the database gateway 210 may store a DB location identifier designating the database 220 to which each query is transmitted to be used for data retrieval, for each of the defined queries. Accordingly, the defined query identified by a pair of identifiers received from the client 130 is transmitted to the database 220 corresponding to an address of the database associated with the DB location identifier, retrieved from the database list, to perform data retrieval in the corresponding database 220.

In the present embodiment, although it has been described that the database 120 in which data retrieval is performed or an address of the database 120 is designated in response to the query maintained by the database gateway 210, this is just an embodiment of the present invention. When data exchange due to the above multicast process is performed in a plurality of the databases 220 connected to one database gateway 210, the same retrieval result information may be generated even though the defined query is transmitted to any one of the databases 220.

The plurality of databases 220 is connected to a certain database gateway 210 and retrieves data by using a query transmitted from the connected database gateway 210. In this case, the connection between the database gateway 210 and the database 220 may be performed by considering the query maintained by a certain database gateway 210, or included data of the database 220 generating suitable retrieval result information in response to a corresponding query. In addition, the connection between the database gateway 210 and the database 220 may be repeatedly opened or released. The database 220 receiving the defined query from the database gateway 210 enables included data to be retrieved in response to the defined query, to generate retrieval result information transmitted from the query transmission system 200 to the client 130.

After the database 220 is connected to the database gateway 210, the database gateway 210 may maintain a database list with respect to a plurality of the databases 220 connected to the database gateway 210, in the memory 215. The database list includes information on the databases 220 connected to the database gateway 210. For example, the database list may include a name or an address of the database 220 connected to the database gateway 210.

Also, the database 220 may transmit a parameter and column of the transmitted defined query to the client 130 as retrieval result information with respect to the data retrieval. In this case, the parameter may include a form, a length, and a command-index of an input value of the defined query. Also, the column may include a form, a length, and a command-index of an output value of the defined query.

Particularly, the database 220 according to the present invention may be connected to or not connected to the database gateway 210 at anytime according to a system environment. Accordingly, the database gateway 210 may update a previous data list. Namely, instead of changing all of source programs associated with a query, according to a change of the database 220, the database gateway 210 updates the database list, thereby enabling the query transmission system 200 to recognize the change of the database 220.

As described above, in the query transmission system 200, the previously made query is stored in response to the pair of identifiers and the database gateway 210 identifies the query corresponding to a received pair of identifiers from the client 130, thereby preventing frequent errors and typos due to the client 130 making a query every time the query is required.

The query transmission system 200 transmits the identified query to the database 220 whose address is designated or a random database 220 connected to the database gateway 210 and performs data retrieval using the query in the corresponding database 220, thereby generating retrieval result information corresponding to the query.

FIG. 3 is a diagram illustrating an example of identifying a defined query and data retrieval using the identified defined query. The client 130 wanting to generate a certain query transmits a pair of identifiers associated with the query to the query transmission system 200. For this, the client 130 has to previously recognize the pair of identifiers corresponding to the query and the query transmission system 200 may provide the pair of identifier corresponding to the query, namely, a group identifier and a query identifier, to the client 130.

The database gateway 210 may store a defined query corresponding to the group identifier and the query identifier and may assign group identifiers A or B and query identifiers 1 through 3 to each of 5 queries, as shown in part i) of FIG. 3. In addition, a DB property identifier and a DB location identifier may be corresponding to each query. The query transmission system 200 may acquire an address of the database 220 having property of optimally executing the identified query.

For example, when receiving the group identifier A and the query identifier 2 from the client 130, the query transmission system 200 may identify a defined query "ID of a member whose level is higher than 100" in response to the received group identifier A and the query identifier 2. In addition, the query transmission system 200 may verify a DB property identifier corresponding to the identified defined query "ID of a member whose level is higher than 100" as "Oracle" and may recognize a database DB#2 embodied by Oracle as the database 220 to which the identified defined query "ID of a member whose level is higher than 100" will be transmitted.

Also, according to the DB location identifier corresponding to the identified defined query, the query transmission system 200 may acquire an address of the database DB#2 from the database list to transmit the defined query "ID of a member whose level is higher than 100" to the database DB#2. Accordingly, the query transmission system 200 may transmit the defined query "ID of a member whose level is higher than 100" to the database DB#2 corresponding to the address, and may generate predetermined retrieval result information by data retrieval in the database DB#2. In part i) of FIG. 3, it is illustrated that the address of the database DB#2 to which the defined query "ID of a member whose level is higher than 100" is an IP address 175.33.0.2.

In addition, when a query transmission environment is changed according to open or release of the connection between the database gateway 210 and the database 220, relevant information is recorded only in the database list, thereby simply updating the query transmission environment change. Accordingly, when an executable statement executing the query, such as a structured query language (SQL) statement, is efficiently changed, there is no difficulty in amending a source code associated with the query.

Also, a multicast process may be performed between a plurality of databases 220 connected to one database gateway 210. In another embodiment of the present invention, when there is not a DB location identifier designating the database 220 in which the defined query is performed, the query transmission system 200 may transmit the defined query to a random database. In this case, between the plurality of the databases 220 connected to the database gateway 210, data included in the plurality of the databases 220 may be the same due to multicast.

According to the data retrieval in the database DB#2, the query transmission system 200 may generate retrieval result information associated with a member ID and a current level as shown in part ii) of FIG. 3 and may provide the retrieval result information to the database gateway 210 transmitting the query or the client 130 requesting the query. For example, in part ii) of FIG. 3, in response to the query "ID of a member whose level is higher than 100", the query transmission system 200 generates current level information of member IDs warrior, bowyer, and witch, as a retrieval result.

Accordingly, since the query transmission system 200 creates and maintains queries and selectively selects a query corresponding to a group identifier and a query identifier received from the client 130, an error in making a query, which may occur when the client 130 directly inputs the query, may be prevented. In addition, it is not required to change existing source programs as a query transmission environment is changed and the query transmission system 200 may recognize the change of the query transmission environment by only a simple updating of the database list, instead of changing all of the source programs according to the change of the query transmission environment.

Figure 4:
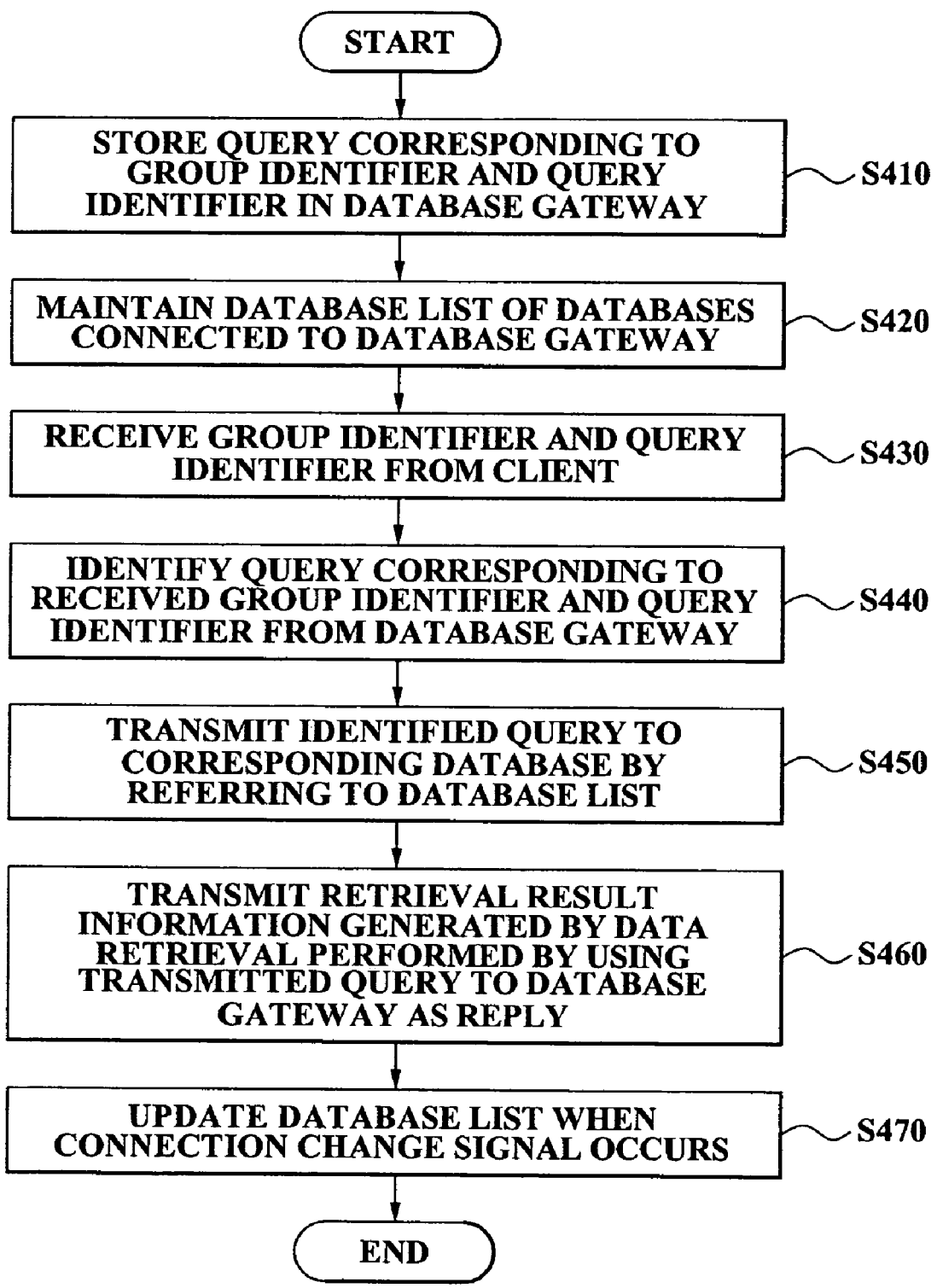
FIG. 4 is a flowchart illustrating a query transmission method according to an embodiment of the present invention.

FIG. 4 is a flowchart illustrating a query transmission method according to an embodiment of the present invention. The query transmission method may be performed by the above query transmission system 200.

The query transmission system 200 maintains a database gateway 210 storing at least one query corresponding to a predetermined group identifier and query identifier (operation S410). In this case, all queries having a possibility of being input by the client 130 and previously made by the administrator of the query transmission system 200 are stored in the database gateway 210 in response to a pair of identifiers.

Particularly, the query transmission system 200 may assign a group identifier or a query identifier corresponding to each query by considering a query occurrence environment. Namely, the query transmission system 200 may verify a geographical location of an area in which a certain query frequently occurs or service characteristic of the query and may assign a common group identifier to queries of the same area and service characteristic. For example, when the service characteristic performed by the database gateway 210 is "retrieving personal information of a gamer", the group identifier A may be assigned to a query determined to be associated with the service characteristic (refer to part i) of FIG. 3).

Also, the query transmission system 200 may assign a query identifier for distinguishing a certain query from a plurality of queries to which the same group identifier is assigned. For example, as the query identifier, a sequential series of numbers such as 1, 2, 3, . . . may be assigned to each of the queries to which the same group identifier is assigned (refer to part i) of FIG. 3).

The query transmission system 200 maintains a database list of a plurality of databases 220 connected to the database gateway 210 (operation S420). In this case, information of the databases 220 currently connected to the database gateway 210 is recorded as a list. The database list may include identification information and address information of the database 220 connected to the database gateway 210.

The query transmission system 200 receives a group identifier and query identifier associated with a certain query from the client 130 (operation S430). In this case, the client 130 desiring particular data to be retrieved by the certain query inputs the group identifier and query identifier associated with the query. The query transmission system 200 previously provided the group identifier and query identifier required to retrieve data of the certain query, to the client 130 to precisely input the group identifier and query identifier.

The query transmission system 200 identifies a query corresponding to the received group identifier and query identifier from the database gateway 210 (operation S440). In this case, the query corresponding to the group identifier and query identifier received from the client 130 is retrieved from the memory 215 of the database gateway 210.

The query transmission system 200 transmits the identified query to the corresponding database 220 by referring to the database list (operation S450). In this case, a DB location identifier corresponding to the identified query is verified and an address of the database 220 corresponding to the verified DB location identifier is retrieved from the database list. Accordingly, the query identified by the pair of identifiers may be transmitted to a certain database 220 capable of generating an optimal retrieval result in response to the query.

The query transmission system 200 transmits retrieval result information generated by data retrieval using the query transmitted from the database 220, to the database gateway 210 as a reply (operation S460). In this case, the retrieval result information corresponding to the query is generated by the data retrieval in the database 220 to which the query is transmitted and is provided to the client 130 via the database gateway 210.

Thus, according to the present invention, a defined query is selectively extracted by a call of the client 130, thereby preventing an error that may occur when inputting a query and a problem occurring due to using a wrong query.

The query transmission system 200 updates the database list when a connection change signal occurs in association with the database 220 connected to the database gateway 210 (operation S470). In this case, the query transmission system 220 may recognize a change in a query transmission environment by only updating the database list when there is the change in the query transmission environment such as release of connection between the database gateway 210 and the database 220.

Thus, according to the present invention, although there is the change in the query transmission environment, only a simple updating of the database list is required, instead of amending all of source programs associated with the change in the query transmission environment.

Exemplary embodiments according to the present invention may include a computer-readable recording medium including a program instruction for executing the operations executed via various computer units. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter.

As described above, an aspect of the present invention provides a query transmission method and system in which queries are previously defined and maintained and a query corresponding to a group identifier and query identifier received from a client, thereby preventing an error occurring when the client directly inputs a query.

An aspect of the present invention also provides a query transmission method and system in which a plurality of databases is systematically associated with each other as one database to be used for data retrieval, thereby generating more various and plentiful retrieval result information than data retrieval performed limited to one database.

An aspect of the present invention also provides a query transmission method and system in which a change in a query transmission environment is recognized by simply updating a database list, instead of changing all of source programs associated with the query transmission environment.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of processing a query related to information of a gaming application that is stored in a plurality of game databases, the method comprising:

providing a database gateway in communication with a plurality of databases comprising first and second game databases having respectively different properties for processing queries related to the information of the gaming application, the database gateway storing a plurality of pre-formulated queries for information from the gaming application therein, each pre-formulated query being identified at least by a combination of a group identifier that identifies at least one set of queries for information from the game application and a query identifier that identifies at least one query for information from the gaming application among the at least one set of queries, each database being assigned a database attribute identifier that indicates its respective properties, each pre-formulated query being also assigned a database attribute identifier, wherein a pre-formulated query having a particular database attribute identifier is configured to be processed in at least one database among the plurality of databases, that is assigned the particular database attribute identifier, based on the properties of the at least one database;

receiving, in the database gateway, a first group identifier and a first query identifier from a terminal associated with a user;

identifying, in the database gateway, a first pre-formulated query among the plurality of pre-formulated queries using both the first group identifier and the first query identifier;

determining, in the database gateway, that the first pre-formulated query is assigned a first database attribute identifier;

selecting, in the database gateway, the first database from the plurality of databases, wherein the first database is known to the database gateway as capable of answering the first pre-formulated query based on the properties of the first database and as assigned the first database attribute identifier;

transmitting the first pre-formulated query to the first database for processing; and coordinating, in the database gateway, an answer to be made available to the user based on a response from the first database.

2. The method of claim 1, wherein coordinating comprises:
receiving, in the database gateway, the answer from the first database; and
forwarding the answer to the terminal or another terminal associated with the user.

3. The method of claim 1, wherein it is predetermined that the pre-formulated query is to be answered by the first database.

4. The method of claim 1, wherein a list of the plurality of databases connected to the gateway is stored in the database gateway.

5. The method of claim 1, wherein the first database is updated with data to be used in answering the query along with one or more other databases belonging to the plurality of the databases.

6. The method of claim 5, wherein the first database is updated by multicasting to at least part of the plurality of databases information so as to make the at least part of the plurality of databases to be consistent.

7. The method of claim 1, wherein the database gateway comprises a computer or a computerized device connected to an information network and configured to process the received query.

8. The method of claim 1, wherein the first database comprises a computer or a computerized device storing data and configured to process the first pre-formulated query transmitted from the database gateway.

9. The method of claim 1, wherein the database gateway selects the first database as the first database has a particular property known to the database gateway that enables the first database to make an appropriate response to the first pre-formulated query.

10. The method of claim 1, wherein the first database attribute identifier comprises information indicative of one selected from the group consisting of Oracle, MSSQL, and MySQL.

11. The method of claim 1, wherein selecting comprises first selecting at least one database known to the database gateway as capable of answering the first pre-formulated query, wherein the at least one database comprises the first database, and subsequently selecting the first database among the at least one database as assigned the first database attribute identifier.

12. The method of claim 1, wherein the database gateway is separate from the plurality of databases.

13. A system for processing a query related to information of a gaming application that is stored in a plurality of game databases, the system comprising:

a database gateway communicably connected to a plurality of different databases comprising at least a first database, the first database comprising data of the gaming application and being configured to process and answer a query using the data, wherein the configuration of the first database is indicated by at least one database attribute;

wherein the database gateway comprises:
a memory configured to store a plurality of pre-formulated queries therein, each pre-formulated query being identified at least by a combination of a group identifier that identifies at least one set of queries for information from the game application and a query identifier that identifies at least one query for information from the game application among the at least one set of queries, each database being assigned a database attribute identifier, each pre-formulated query being also assigned a database attribute identifier, wherein a pre-formulated query having a particular database attribute identifier is configured to be processed in at least one database that is assigned the particular database attribute identifier;

an identifier receiver configured to receive a group identifier and a query identifier transmitted from a terminal associated with a user;

a processor module comprising at least a processor, the processor module configured to identify a first pre-formulated query among the plurality of pre-formulated queries using both a group identifier and a query identifier received by the identifier receiver, configured to subsequently determine that the first pre-formulated query is assigned a first database attribute identifier, configured to subsequently select the first database from the plurality of different databases that is capable of answering the first pre-formulated query based on the at least one database attribute and is assigned the first database attribute identifier; and an answer coordinator configured to transmit the first pre-formulated query to the first database and further configured to coordinate the first database so as to make an answer from the first database available to the user.

14. The system of claim 13, wherein it is predetermined that the first pre-formulated query is to be answered by the first database.

15. The system of claim 13, wherein the answer coordinator is configured to receive the answer from the first database and further configured to forward the answer to the terminal or another terminal associated with the user.

16. The system of claim 13, wherein a list of the plurality of databases connected to the gateway is stored in the database gateway.

17. The system of claim 13, wherein the first database is configured to be updated with data to be used in answering the query along with one or more other databases belonging to the plurality of the databases.

18. The system of claim 13, wherein the first database comprises a computer or a computerized device storing data and configured to process the query or the information transmitted from the database gateway.

* * * * *